(12) United States Patent  
Sorey

(10) Patent No.: US 7,390,249 B2
(45) Date of Patent: Jun. 24, 2008

(54) FISHERMAN'S AID STATION

(76) Inventor: Bobby Sorey, 1017 Josephine Cres, Virginia Beach, VA (US) 23464

( * ) Notice: Subject to any disclaimer, the term of this patent is extended or adjusted under 35 U.S.C. 154(b) by 398 days.

(21) Appl. No.: 11/112,519

(22) Filed: Apr. 22, 2005

(65) Prior Publication Data

US 2006/0240758 A1 Oct. 26, 2006

(51) Int. Cl.
  *A22C 25/06* (2006.01)
(52) U.S. Cl. ........................................ 452/195
(58) Field of Classification Search ........... 452/194, 452/195, 196; 43/56
  See application file for complete search history.

(56) References Cited

U.S. PATENT DOCUMENTS

| 3,668,739 | A | * | 6/1972 | Lewis | 452/194 |
| 4,454,628 | A | * | 6/1984 | Olson | 452/194 |
| 4,790,097 | A | * | 12/1988 | Blackiston | 43/4 |
| 4,794,670 | A | * | 1/1989 | Savastano, Jr. | 452/149 |
| 6,200,212 | B1 | * | 3/2001 | Henry et al. | 452/194 |
| 6,389,731 | B1 | * | 5/2002 | Freeman | 43/4 |
| 6,427,259 | B1 | * | 8/2002 | Cawthon | 4/650 |
| 6,836,910 | B2 | * | 1/2005 | Cawthon | 4/650 |

* cited by examiner

*Primary Examiner*—Thomas Price
(74) *Attorney, Agent, or Firm*—Goldizen & Associates; Bradley D. Goldizen

(57) ABSTRACT

A compact, portable, multi-purpose fishing aid station providing running water and used for cutting bait, cleaning fish and equipment, washing hands, and the like. The station includes a rigid frame having four sides with openings, and a bottom composed of two perforated sections and one solid surface area in the center. The aid station is equipped with an attached filleting knife and scale brush, and a drainage system. The system of larger openings on the four sides and smaller openings on the bottom allows the removal of fish waste, which also acts as chum, and ensures a clean, waste-free workspace. The station includes a pump that includes tube having a submerged hose for drawing water from a source and output it by means of a bendable spout-like tube. The station can be used separately or easily mounted to the side of a boat by its adjustable clamping system. The clamping system includes an inner base, an outer base, and two support arms. The station attaches to most boats by simply sliding it onto the support arms, and then adjusting the outer clamp until the station is securely fastened.

18 Claims, 5 Drawing Sheets

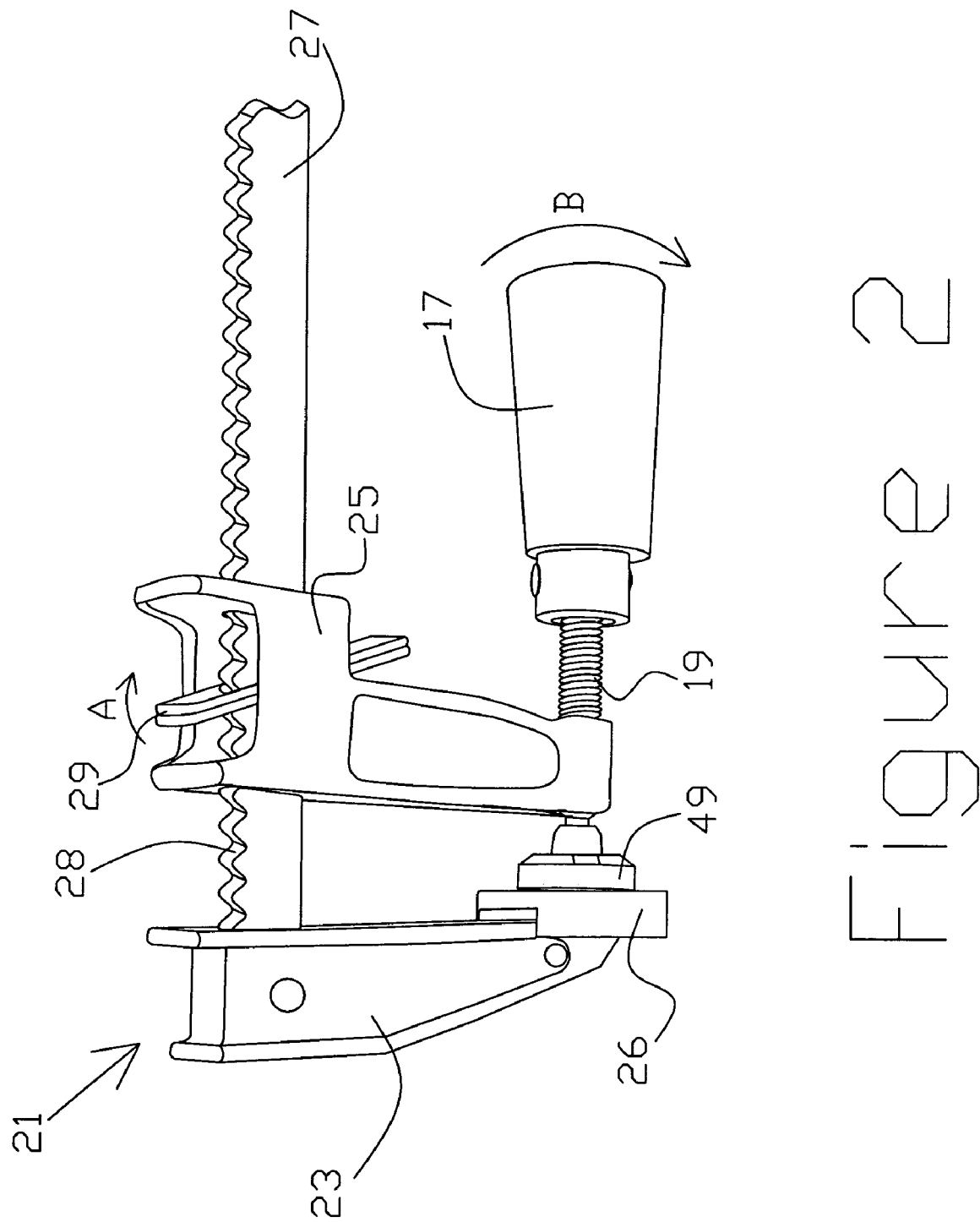

FISHERMAN'S AID STATION

There are no related applications.
This application did not receive federal funding.

BACKGROUND OF THE INVENTION

The present invention is generally related to a detachable assembly that aids fishermen their quest for catching and/or cleaning fish. More particularly, the present invention relates to a portable station capable of being mounted onto a fixed element of a boat and is used for cutting bait, cleaning fish, baiting hooks, cleaning fishing equipment, and washing hands.

Fishermen often want to clean recently caught fish while on their boats. To that end, fish cleaning devices that permanently or temporarily attach to a boat have been disclosed before. Both U.S. Pat. Nos. 3,561,043 and 3,668,739 disclose a fish-cleaning device that is mounted to the user's boat. U.S. Pat. No. 5,098,338 discloses a mountable trough that allows the user to clean the fish in the trough and then push waste matter out the sides. U.S. Pat. No. 6,200,212 describes a V-shaped minnow tank topped by a cutting board that features a clamp to hold the fish. More recently, U.S. Pat. No. 6,554,691 disclosed a device composed of a net within a frame used to clean fish.

Most of the prior art focuses solely on fish cleaning, and bait cutting tasks. Most of these devices utilizes a sturdy container to hold the fish, or a flat surface to cut bait. However, these devices typically only performed a singular or at most a dual function. They did not provide a means to remove the fish waste, offer running water which may be used to clean fish, clean fishing equipment and wash hands. The prior art devices also suffer from teaching a uniform invention capable of being easily fastened to a plurality of boats elements thereof.

Most of the newer devices employ a net or a flat surface with a clamp for holding the fish in place. One drawback is that nets are unhelpful during fishing process because they do not offer a strong, flat surface on which to clean fish, as well as cutting the fish or bait. Another drawback is that the use of a net introduces the risk of cutting the very net that holds the fish. The use a flat surface coupled with a clamp for holding the fishing in place creates additional problems. First, it is difficult to clamp a fish in position, but due to their slippery exterior and flailing tendencies, also difficult to keep them clamped down.

SUMMARY OF THE INVENTION

The current device offers an easily detachable, superior fish cleaning and bait cutting assembly. In place of a net, or a clamp, the assembly comprises a sturdy light-weight metallic or plastic frame that provides a safe and effective place to place that not only contains the fish but provides a surface upon which the fish and bait may be cut into pieces. The center part of the bottom of the invention is solid and advantageously acts as a cutting board. Two side panels offer small perforations where fish waste can fall away from the boat. This self-cleaning function is also furthered enhanced by the openings along the side panel which facilitate the removal of larger pieces of fish matter. And, by releasing such matter directly into the water by the boat, also serves as a source of chum to draw more fish near and enhance the fishing experience.

This invention is also distinguishable by its ease in which the assembly is mounted to a fishing structure such as a boat. Further, the attachment means is adjustable to accommodate various shaped elements while assuring the safe attachment of the fishing station. First, the attachment means comprises at least one support arm, preferably two support arms that detachably affix the assembly to the boat or an element thereof. This feature allows the station to be removed and used independently on land, at dockside, or even within the boat. In addition, the clamps used to mount the device to the side of the boat offer great adjustment flexibility. These clamps have a locking lever that offers additional safety by ensuring that the user cannot accidentally dismount the rectangular container into the water. These levers, operating within the two arms of the outer clamping base, are restricted to certain increments of movement along teeth on the support arms. This allows the clamps to be secured onto a wide range of thicknesses. Once the locking lever is positioned so that the clamp is tightly secured, the twistable hand crank is used. This hand crank moves the outer clamping pad to the outside surface of the boat holding the entire structure securely. The support arms also have circular holes along their sides offering another means of adjustment. The rectangular container can be moved along the teeth of the support arm and then secured in the desired position with metallic pins fasted to the side of the containers. These pins are inserted into the aligned holes within the support arms and the upper lip of the rectangular container.

Another added benefit of the invention is its ability to provide running water for the fisherman. The assembly includes a pump that may be actuated to cause water exterior to the boat to be circulated across the entire assembly thereby providing a source of running water. In the preferred embodiment, a battery-operated pump has an intake tube that is submerged into a source of water, preferably exterior to the boat. That same tube attaches to the pump by a hole in the frame. The pump then is connected to a flexible output tube that acts as a spout that emits water. The water is pumped up and out at the user's will by activating a power switch, preferably located atop the pump in a convenient location. Running water is an extremely useful tool when cleaning fish because it provides a way to remove any remaining matter from the container and the fish itself. In addition, the running water can be used to clean bait, knives or other equipment, and the user's hands.

Finally, this invention is unique because the required fish cleaning tools are already attached to the station. Most stations do not offer this feature making it easy for said tools to fall into the water during use, or be forgotten and thus available when needed. By attaching a filleting knife and a scale brush this invention guarantees that the fisherman will always have the necessary tools on hand.

The above explanations are provided to illustrate the utility of the invention. And, by no means necessary are these explanations intended to limit the application of this invention from being used for other purposes.

BRIEF DESCRIPTION OF THE DRAWINGS

FIG. 2 is a side elevation view of the adjustable clamping mechanism that attaches the fishing aid station to an element of a boat and showing the various elements thereof.

DETAILED DESCRIPTION OF THE INVENTION

Figure 1A:
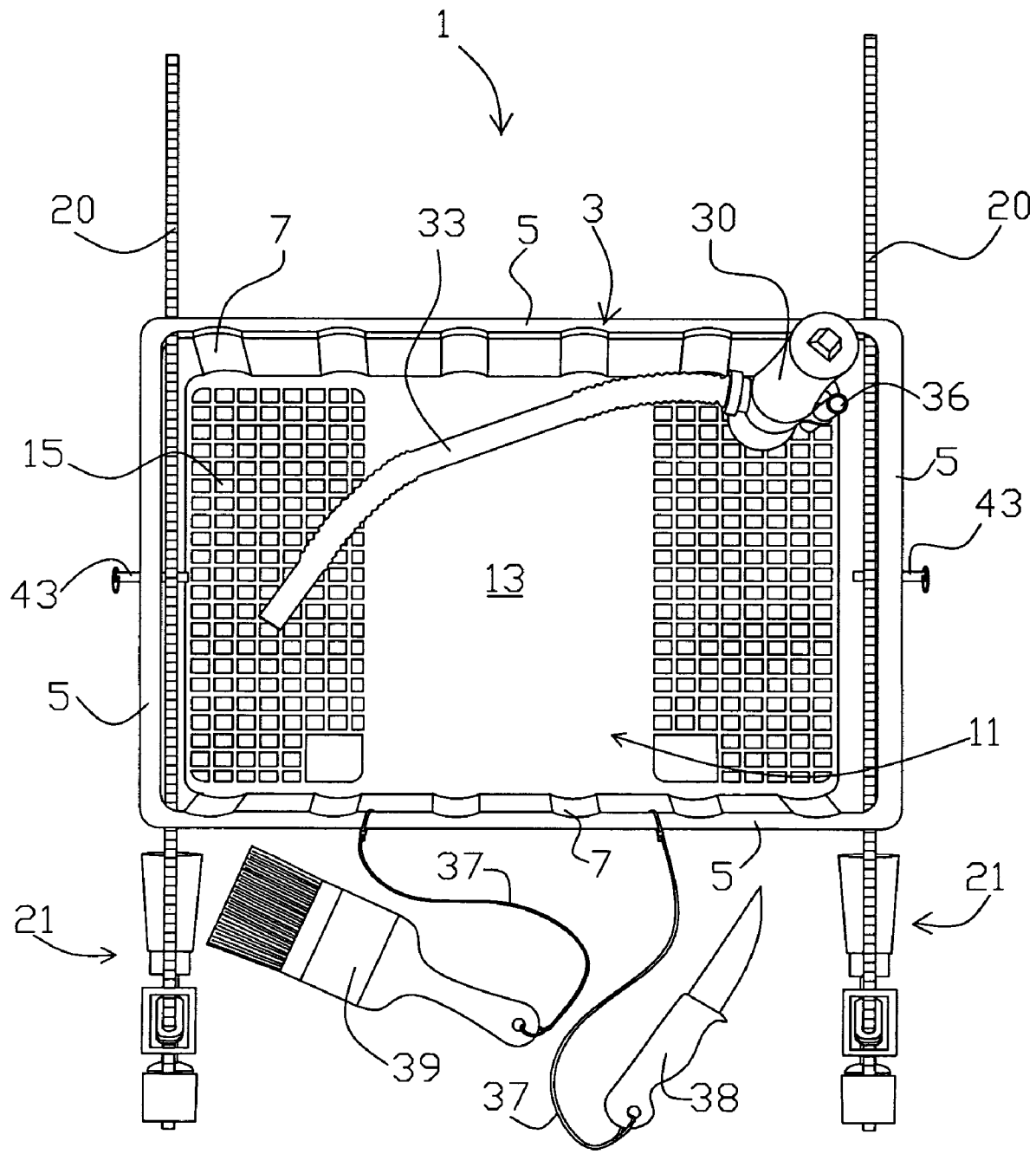
FIG. 1A is overhead view of the entire fishing aid station.

FIG. 1A is an overhead view of the fisherman's aid station 1. In the preferred embodiment, the station 1 includes a base frame 3 that includes four sidewalls 5 and bottom 11. Two of the sidewalls 5 include small openings 7; while the remaining two sidewalls comprise larger openings 9. The sidewalls 5 and bottom 11 define an area where a fish may be deposited for cleaning and processing purposes.

Figure 4:
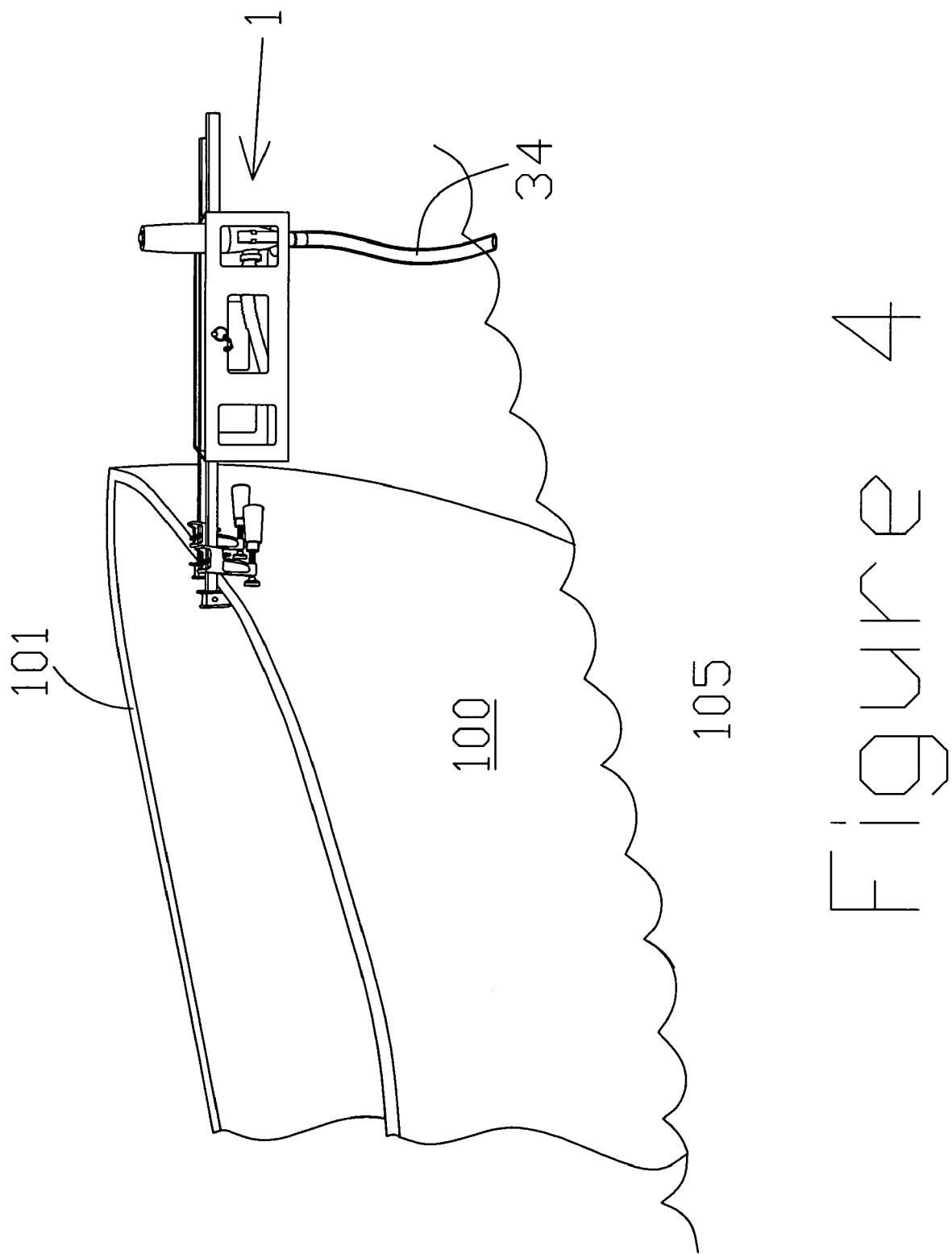
FIG. 4 depicts the fishing aid station being attached to a hull of a boat.

The bottom 11 comprises a solid region 13 in the central area that functions as a cutting board for cleaning fish and cutting bait. Small openings 15 are arranged on either side of the cutting board area 13. The openings 15 in the bottom 11 operate to drain water and small particulates from the aid station 1. The openings 7, 9 and 15 operate as a chum source if the aid station 1 is secured to a hull of a boat as shown in FIG. 4. That is, when bait is cut or a fish is cleaned and processed, the waste material is drained or deposited into the water near the boat via the aforementioned openings.

A support arm mechanism 20 is provided on either side of the aid station. Each support arm mechanism includes a clamping mechanism 21 discussed hereinafter with respect to FIG. 2. The support mechanisms pass through the sidewall 5 or frame 3 to assure stability of the aid station 1. A brush 39 and a knife 38 are coupled to the aid station via a lanyard 37 for ensuring that either will not be lost if dropped by the user while processing a fish or cutting bait.

Figure 1B:
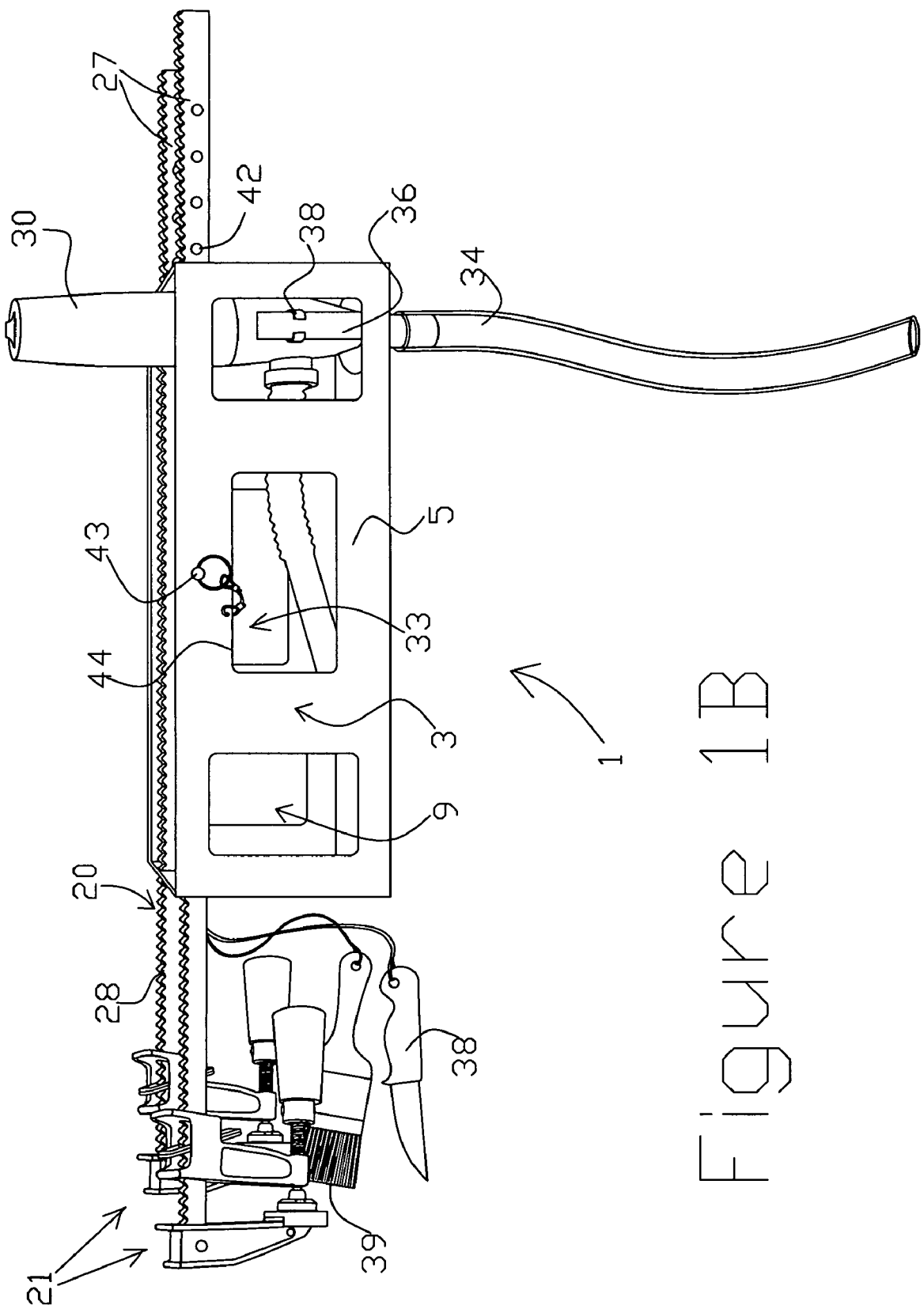
FIG. 1B is a side view of the fishing aid station.

A pump assembly 30 is secured to a pump base support 36 that extends upwards from the bottom 11 of the frame 3. The pump 30 includes an extendable output hose 33. Pins 43 extend through respective sidewalls 5 for allowing a distance between the aid station 1 and an object upon which it is mounted to be readily adjusted, as more clearly understood by FIG. 1B. Each support arm mechanism 20 includes a plurality of holes 42 and teeth 28 disposed along an edge of the support arm 27. Sidewall 5 also includes a hole. A pin 43 is attached to sidewall 5 as shown, and extends through the hole in the sidewall and on through one of the adjustment holes 42. A handle hole 33 is provided on opposite sidewalls 5 for lifting aid station and securing it in place. Intake tube 34 for drawing water from a water source extends downward from pump 30 as shown. An end of the intake tube 34 may be deposited into a water source as shown in FIG. 4.

Now turning to FIG. 2 which shows an enlarged view of the clamping mechanism 21 that secures the support arm mechanisms 20 to a portion of the boat such as the hull. The clamping mechanism 21 includes a catch 29 which engages teeth 28 to provide a rough adjustment means actuated by a finger/thumb adjustment. Catch 29 is pushed or squeezed in the direction indicated by Arrow A to disengage it from teeth 28. In this manner, the movable frame 25 can be quickly moved to clamp the support arm mechanism in place. Rotatable handle 17 may then be rotated in the direction indicated by Arrow B to further tighten movable pad 49 against a surface positioned between pad 49 and fixed pad 26. In this manner, the movable frame 25 and fixed frame 23 create a squeezing action that secures the support arm 27 in place. Threaded shaft 19 passes through a threaded portion of the movable frame allowing fine adjustments of the clamping mechanism 21.

Figure 3:
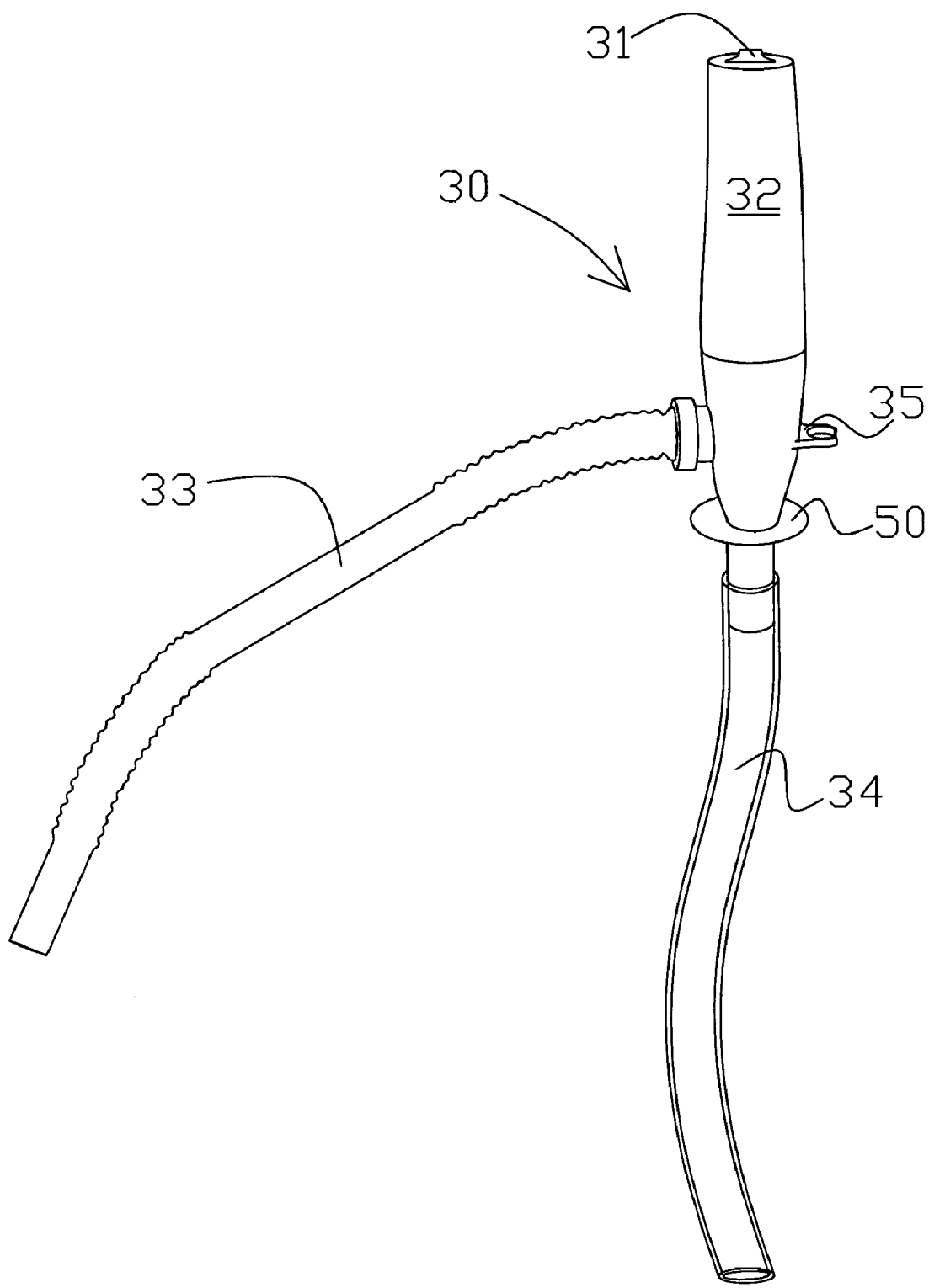
FIG. 3 is a perspective view of a battery-operated pump showing the intake and output hoses, power switch and circular clip used to fasten the pump to the frame.

FIG. 3 is a perspective view of the pump assembly 30. The assembly 30 comprises a body that houses the pump and a battery compartment. It should be noted that the pump may be a manually actuated pump assembly thereby alleviating the necessity for a power source. Otherwise, the pump may be coupled to the power system of the boat, dock or the like and operated by a source external to the pump. The pump assembly 30 further includes a power switch 31 for activating the pump 30. A fastening clamp 35 is provided for attaching the pump 30 to frame 3 via pump support 36. The pump 30 also includes a pump base flange 50 for assuring stability of the pump 30 relative to the frame 3. A pump intake hose 34 draws water from a source which is expelled from the pump 30 via output hose 33 which may be used to direct the water across fish, bait, equipment, hands or the like.

As shown in FIG. 4, the aid station 1 may be coupled to the hull 101 of boat 100. An end of intake hose 34 is dropped into water source 105 from which water may be directed in a desired direction.

The flexibility of the fisherman's station is unparalleled. The station is not permanently attached to the boat giving the user the ability to attach or detach the station as needed. Additionally, the adjustable clamping bases, and adjustment points along the support arms ensure the station will secure tightly to most boats. In addition, the fisherman's aid station is not limited to any certain dimensions or type of material used. Thus, it can easily be adapted to fit any boat or use.

The flexibility of use is also complimented by the practicality of the device. The fisherman's aid station serves multiple purposes. It provides a safe and efficient area to clean fish. And, as a bonus it provides drainage of waste that maintains a clean work area and acts as chum to attract more fish. The fisherman's station also provides a useful bait-cutting surface. Also, it makes fish cleaning and bait-cutting easier by supplying the user with attached fillet knife and scale brush. Finally, the fisherman's station offers running water which aids in cleaning hands, equipment, fish, or bait.

While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A fishing aid station that provides a source of running water for cutting bait and cleaning fish while providing a source of chum for attracting fish, said fishing aid station comprising:
    a frame having four sidewalls and a bottom that define an area in which bait or fish may be deposited for processing;
    a water pumping source attached to said frame that provides running water to be passed across said frame;
    a pair of support arms adjustably attached to said frame; and,
    a clamping mechanism attached to each of said support arms that quickly couples and decouples the fishing aid station to a fishing structure.

2. The fishing aid station of claim 1 further comprising a brush attached to said frame via a lanyard.

3. The fishing aid station of claim 1 further comprising a knife attached to said frame via a lanyard.

4. The fishing aid station of claim 1 wherein said water pumping source comprises an electric pump having an input hose with an end submerged into a source of water in which fish are present.

5. The fishing aid station of claim 1 wherein said clamping mechanisms comprise:
    a movable clamp frame that slides along said support arm and including a catch to quickly engage a portion of the support arm; and, a fixed clamp frame attached to an end of said support arm.

6. The fishing aid station of claim 5 further comprising:
a rotatable handle coupled to said movable clamp frame via a threaded shaft that passes through a threaded portion of the movable clamp frame;
a movable pad attached to an end of said threaded shaft opposite the rotatable handle; and,
a fixed pad attached to said fixed clamp frame.

7. The fishing aid station of claim 1 further comprising a support arm having a plurality of teeth disposed along an edge thereof and being engaged by said clamping mechanism.

8. The fishing aid station of claim 1 wherein said bottom of the frame includes a solid having solid region used as a cutting board and at least one region arranged against said solid region and having drain holes that drain water and waste matter to create a source of chum.

9. The fishing aid station of claim 1 further comprising:
a pair of pins attached to opposite sidewalls for adjusting a distance between the fishing aid station and a fishing structure to which the fishing aid station is attached;
two sidewalls comprising holes that accept the pair of pins; and,
support arms that comprise holes that accept the pair of pins,
wherein each pin passes through the holes in the sidewalls and into the support arms.

10. The fishing aid station of claim 1 further comprising a boat.

11. A fishing aid station comprising:
a frame having four sidewalls and a bottom that define an area for at least cutting bait and cleaning fish, said bottom including a solid portion that operates as a cutting board and a perforated portion having drain holes that operates to drain water and waste from said frame;
an electric pump for circulating water attached to said frame, said pump including an intake hose having an end deposited into a water source and an output hose for dispensing water across fish to be cleaned; and,
a support system including two support arms, each support arm having teeth disposed on an edge thereof, a clamping mechanism is attached at an end of said support arm, said clamping mechanism having a catch that engages said teeth to secure the fishing aid station to a fishing structure.

12. The fishing aid station of claim 11 wherein said support system comprises a clamping mechanism having a rotatable handle for securing the fishing aid station to a fishing structure.

13. The fishing aid station of claim 11 further comprising:
handle openings in two of said sidewalls that assist in attaching and detaching said fishing aid station.

14. The fishing aid station of claim 11 wherein each of said support arms include holes for adjustably attaching the aid station to the support arms.

15. The fishing aid station of claim 11 wherein said sidewalls further comprise openings for allowing waste to pass from the frame to an exterior thereof.

16. The fishing aid station of claim 11 further comprising a knife and a lanyard.

17. The fishing aid station of claim 11 further comprising a brush and a lanyard.

18. A fishing aid station comprising:
a bottom having a solid portion that operates as a cutting board, said bottom further including at least one perforated area that drains waste water from the fishing aid station;
a first pair of sidewalls attached to and arranged on opposite sides of said bottom and having openings for allowing waste to be removed from the fishing aid station;
a second pair of sidewalls attached to and arranged on opposite sides of said bottom and perpendicular to the first pair of sidewalls, each of said sidewalls of the second pair of sidewalls having handles for aiding in attaching the fishing aid station to a fishing structure, each of said second pair of sidewalls having a small hole near a top and center thereof for accepting a pin to pass therethrough;
a pump having an intake and output and attached to one of said sidewalls and said bottom, said pump providing water to be passed across said fishing aid station;
a pair of support arms having a plurality of openings arranged along a side thereof for passing a pin therethrough, said support arms further including a plurality of teeth arranged on an edge thereof; and,
a clamp attached to each support arm, said clamp including a clasp that engages the plurality of teeth and a rotatable handle for tightening the clamp.

\* \* \* \* \*